United States Patent

[11] 3,554,310

[72] Inventor Harry A. Dieffenbach
Walnut Lane Farm, North East, Md. 21901
[21] Appl. No. 784,432
[22] Filed Dec. 17, 1968
[45] Patented Jan. 12, 1971

[54] LAND TRACK VEHICLE
7 Claims, 5 Drawing Figs.

[52] U.S. Cl. .................................................. 180/9.24, 305/25
[51] Int. Cl. ................................................. B62d 55/10
[50] Field of Search .......................................... 180/9.24, 6.7; 305/24, 25, 35(EB)

[56] References Cited
UNITED STATES PATENTS

| | | | |
|---|---|---|---|
| 1,885,486 | 11/1932 | Smyth | 305/25 |
| 2,154,377 | 4/1939 | Cory | 305/20X |
| 2,592,023 | 4/1952 | Gleason | 180/9.24 |
| 3,127,188 | 3/1964 | Greub | 280/5.22 |
| 3,204,716 | 9/1965 | Phillips | 180/9.24X |
| 3,288,234 | 11/1966 | Feliz | 305/24 |

*Primary Examiner*—Richard J. Johnson
*Attorney*—Mason, Fenwick & Lawrence

ABSTRACT: A land vehicle having flexible endless tracks extending from and over front and rear wheels with a ground-engaging flight having backup means in the form of plural vertically adjustable metal skids each having a low-friction nylon surface engaging the inside surface of the track for resisting upward movement of that portion of the inside of the tracks between the wheels.

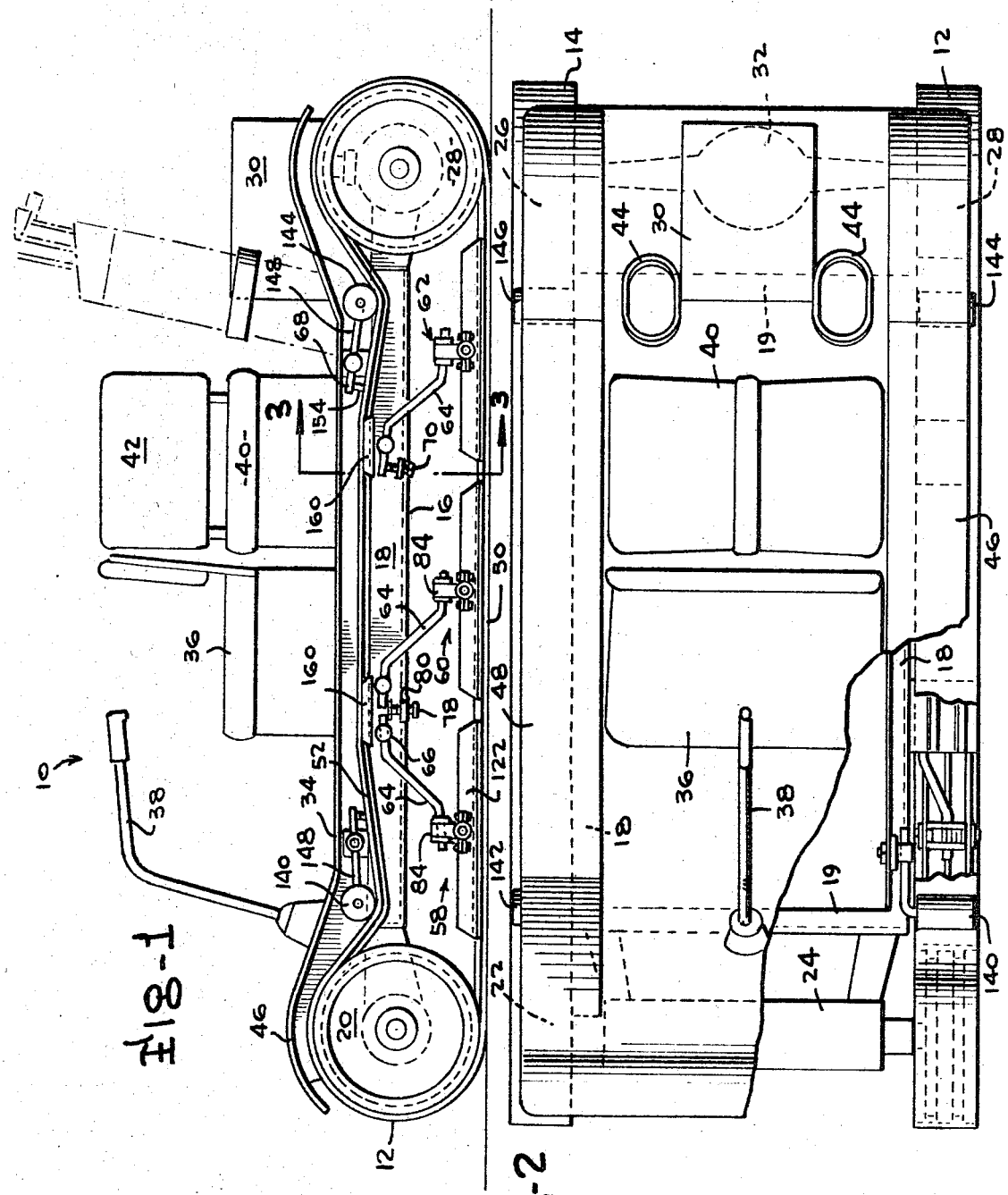

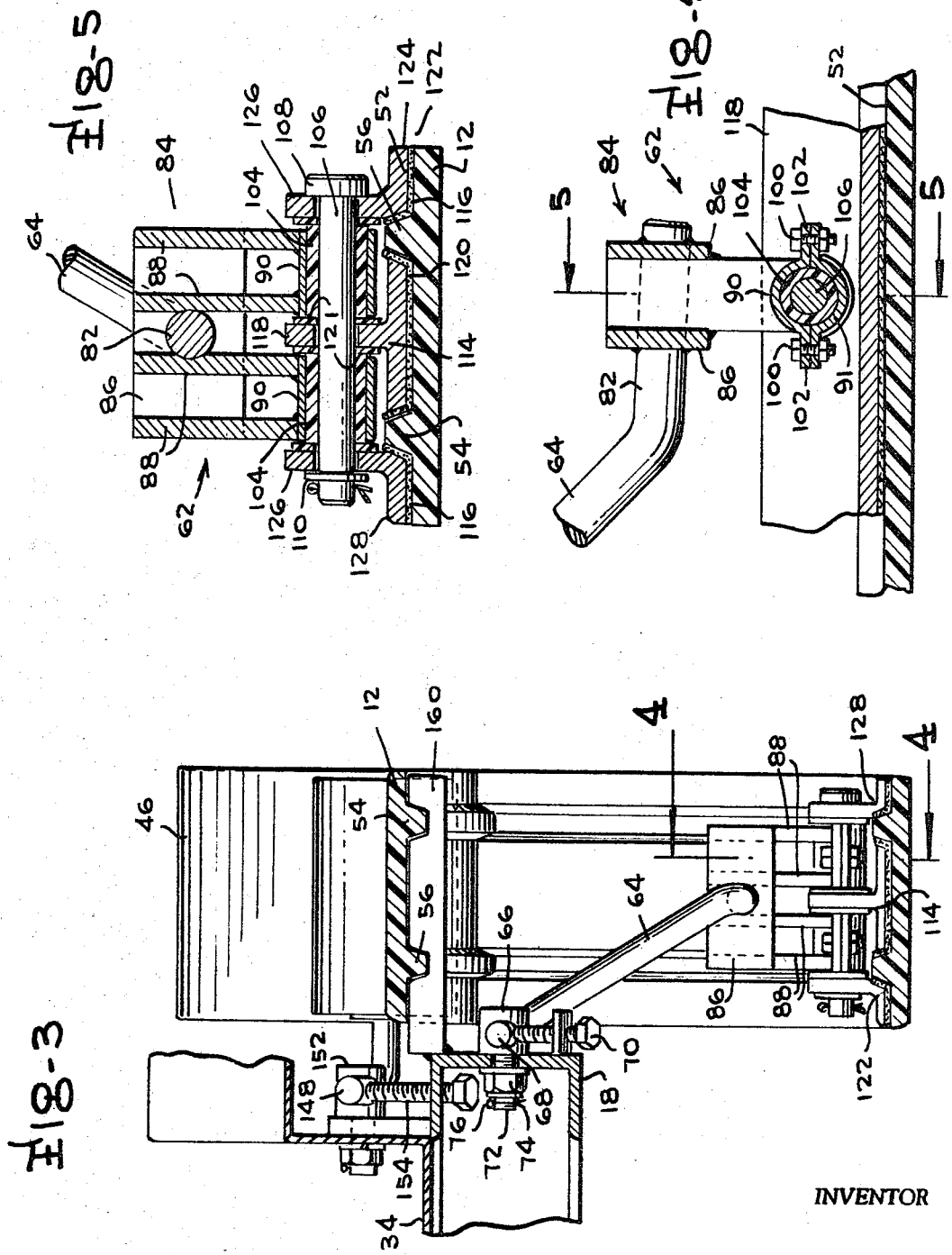

3,554,310

LAND TRACK VEHICLE

BACKGROUND OF THE INVENTION

This invention is directed to the field of land vehicles and is specifically directed to a land vehicle of the type employing flexible endless tracks.

Tracked vehicles are of particularly great utility in providing travel over soft ground by virtue of their low average pressure on the ground. However, the prior known devices of this type have all suffered from a number of drawbacks which have prevented their acceptance in low-cost lightweight vehicles such as golf carts and the like.

One of the primary defects of the previously known vehicles of this sort has been the necessity of providing a number of intermediate rollers engaging the inside surface of the track for distributing the weight of the vehicle over the entire track means and to consequently avoid high pressure ground loads of the type which would mar the surface of the soil over which the vehicle is being operated. Such rollers required considerable expenditure in their initial construction by virtue of having to include expensive supports, bearings and the like. Moreover, rollers of this type also inherently require a substantial amount of maintenance such as periodic lubrication and the maintenance of the rollers and bearings in a relatively clean condition.

Recognition of the problems inherent in the conventional endless track land vehicles has resulted in a variety of vehicles purporting to solve the numerous problems. For example, a number of patents have been granted upon air cushion type devices for association with track vehicles such as, for example, U.S. Pat. Nos. 3,261,418 and 3,331,461. However, although certain of these devices have proven to be functionally satisfactory, their cost of manufacture and maintenance has been so high as to prevent their widespread acceptance and utilization.

The instant invention, on the other hand, provides a uniquely simple, reliable and economical means for supporting the ground-engaging portion of an endless track vehicle which requires a minimum of maintenance and is essentially trouble free. Moreover, the instant invention is extremely economical to manufacture when compared to other known devices and has unique versatility, in that it is easily adjusted for supporting varying loads on the vehicle in an optimum manner.

SUMMARY OF THE INVENTION

Therefore, it is the primary object of this invention to provide a new and improved endless track-type vehicle that is both economical to manufacture and maintain while providing optimum functional efficiency.

Obtainment of the object of this invention is enabled through the provision of a track vehicle employing first and second flexible endless tracks or belts extending over front and rear wheels on each side of the vehicle. The lower flight of the belts engages the ground and has an inside surface which is engageable with a plurality of skids attached to the vehicle chassis. Each skid includes a metal plate having an outer layer in the form of low-friction plastic such as nylon attached thereto. The nylon engages the inside surface of the belt to provide optimum support thereof with a minimum of frictional drag. Moreover, the belt is provided with two parallel inwardly extending positioning ribs extending about their entire inner periphery between which and adjacent to which the metal plates are positioned for retaining the belts in position on the vehicle. Moreover, the skids are supportingly connected to the chassis by adjustable torsion bars that are adjustable for varying the downward pressure of the skids on the belts.

Optimum functional efficiency and economy of operation and initial cost are achieved by the aforedescribed construction so as to provide a distinct improvement over the previously known vehicles of this type.

DESCRIPTION OF THE DRAWINGS

FIG. 1 is a side elevational view of a preferred embodiment of this invention in the form of a golf cart;

FIG. 2 is a top plan view of the preferred embodiment illustrated in FIG. 1;

FIG. 3 is a sectional view taken along lines 3–3 of FIG. 1;

FIG. 4 is a sectional view taken along lines 4–4 of FIG. 3; and

FIG. 5 is a sectional view taken along lines 5–5 of FIG. 4.

DESCRIPTION OF THE PREFERRED EMBODIMENT

Attention is initially invited to FIGS. 1 and 2 which illustrate the preferred embodiment of this invention which is in the form of a golf cart 10 having a first endless belt or track 12 on one side and a second endless belt or track 14 on the other side. Gold cart 10 is provided with a main chassis 16 of generally rectangular shape and which includes a pair of side frame members 18 extending along each side of the vehicle connected at their ends by transverse frame members 19.

A first wheel 20 is connected to the left front corner of the chassis and a second wheel 22 is connected to the right front corner of the chassis by means of a wheel bearing support bracket 24 extending forwardly from points on either side of the chassis adjacent the forward termination of the side frame members 18. A third wheel 26 is mounted adjacent the right rear corner of the chassis and a fourth wheel 28 is mounted adjacent the left rear corner of the chassis as shown in FIGS. 1 and 2.

Third and fourth wheels 26 and 28 are drivingly connected to a motive power source, such as a small gasoline, electric, or other type engine mounted within a motor enclosure 30. Motive power is supplied to the third and fourth wheels through a conventional differential 32 in a known manner. The first track or belt 12 extends about the peripheries of the first wheel 20 and the fourth wheel 28 as will be obvious from inspection of FIG. 1. Moreover, the second track or belt 14 is mounted over the peripheries of the second wheel 22 and the third wheel 26. The tracks are driven in a conventional manner by means forming no part of this invention; however, it should be noted that the driving means normally includes clutching and/or braking means for either driving the tracks simultaneously for forward motion or driving and simultaneously braking the tracks individually for turning movement.

A flat deck or platform 34 is attached to the upper side of the chassis and has a first seat 36 for the driver mounted rearwardly of a control stick 38. A second seat 40 divided by a bisecting back rest 42 is mounted immediately to the rear of the first seat 36 as will be obvious from inspection from FIGS. 1 and 2 of the drawing. Moreover, since the preferred embodiment of the device is in the form of a golf cart, a pair of golf bag supporting brackets 44 are attached to the right and left sides of the motor enclosure 30 as shown in FIG. 2.

It should be noted that the space between the seats 36 and 40 can be employed for storage batteries when the device is of the electrically powered type.

A left track fender 46 extends above and along substantially the entire length of the left track 12 and it is unitarily formed with the platform 34 as shown in FIG. 3. A right track fender 48 extends above and substantially along the entire length of the right track in a like manner.

It should be noted that each track includes a ground engaging flight 50 extending between the lower periphery of the wheels upon which the particular track is mounted. Moreover, each belt or track includes an inside or interior surface 52 which engages the respective wheels over which the track is mounted. Inside surface 52 is provided with a first or outside rib 54 and a second, or inside rib 56. Ribs 54 and 56 are endless and extend about the entire inner periphery of each belt or track and serve to retain the belts in lateral position.

Resistance to upward movement of the ground-level flight is provided by three skid units associated with each track. Specifically, a first skid unit 58, a second skid unit 60, and a third skid unit 62, with each of said skid units being identical to the other. Consequently, only one of such units 62 will be discussed in detail with it being understood that the other units are identical.

Each skid unit is adjustably supported by a torsion bar 64 which, at its upper end, is provided with a pivotable base block 66 through which it extends but to which it is permanently connected by means of welding or the like so as to have a forward upper termination in the form of an adjustable rod end 68 engageable by an adjustment bolt 70 which limits the amount of pivotal movement possible for the base block. The base block 66 is provided with a threaded extension 72 to which is connected a bolt 74 for retaining the base block in position on side frame 18 as illustrated in FIG. 3. A cotter key 76 provides an additional safety factor in insuring that bolts 74 will not loosen so as to invite mishap or injury to the machine or operator.

While the foregoing discussion has been directed to the third skid unit 62, it should be noted that the first skid unit 58 and the second skid unit 60 are both connected to frame member 18 in an identical manner. However, a single adjustment bolt 78 having a plate on its upper end is provided for engaging the two rod ends 68 of the respective torsion bars 64 of the skid units 58 and 60 as shown in FIG. 1. Adjustment bolt 78 is attached to a side bracket 80 extending outwardly from the lower edge of frame member 18 as shown in the drawings.

The lower end 82 of each of the torsion bars 64 is weldingly connected to a pivot shaft support bracket generally designated 84. A pivot shaft support bracket 84 comprises a pair of horizontal transversely extending support plates 86 through which the lower end 82 of the torsion bars extend and to which the torsion bars are weldingly connected. Four vertical spacer plates 88 extend downwardly from and separate the horizontal plates 86 as shown in FIGS. 4 and 5. A half-cylindrical sleeve 90 is welded to the lower end of the two vertical plates 88, respectively, on each side of the lower end 82 of the torsion bar as shown in FIGS. 4 and 5. A lower half-cylindrical sleeve 91 is connected to the upper sleeve 90 by means of bolts 100 which pass through a pair of apertured tabs 102 located on each side of the sleeves as shown in FIG. 4. The cylindrical space within the confines of each of the upper half-cylinder sleeves 90 and the lower half-cylinder sleeves 91 is provided with a cylindrical bearing 104 formed of nylon, teflon, or other similar material. A smooth surfaces pivot pin 106 extends through the two cylindrical bearings 104 and is easily pivoted with respect thereto. Pivot pin 106 is retained in position by head 108 on one end of the pin and a cotter key and washer arrangement 110 on the other end.

Each skid unit includes a main, centrally oriented, skid 114 oriented between the first or outside rib 54 and the second or outside rib 56. The main skid includes a bottom plate 116 with a vertically extending apertured plate 118 extending upwardly from the middle thereof and having an aperture through which pin 105 extends so that the main skid is pivotable about pin 106. The lower surface of the bottom plate 116 and the side edges thereof are covered by a layer of low-friction material 120 bonded or otherwise attached in a conventional manner, such as, for example, through the use of countersunk screw members. While nylon is the preferable material for formation of layer 120, other materials, such as teflon, can be used if desired. The side edges of the lower plate are also covered by the low-friction material so that the side edges can engage the inwardly facing surfaces of ribs 54 and 56 in the manner illustrated in FIG. 5. Moreover, a pair of low-friction nylon washers 121 are located on each side of the vertical plate 118 for reducing the friction resistance to pivotal movement of the main skid 114.

An interior skid plate 122 is provided on the interior edge of each track and includes a bottom plate 124 and a vertically extending apertured plate 126 extending upwardly from one edge of the bottom plate 124. The lower surface of plate 124 and the exterior edge thereof adjacent rib 56 are provided with a layer of low-friction material 116 in a manner identical to the low-friction layer attached to the main skid 114. An outside skid plate 128 of identical construction to the interior skid plate 122 is provided adjacent the outer edge of the belt so as to engage the inside surface 52 thereof and the side of rib 54 as shown in FIG. 5.

Therefore, each skid unit provides three separate skid plates which are pivotal when the track is passing over obstructions, rocks, or the like so as to provide a substantially smooth ride while providing a low-pressure contact with the ground. The pressure contact with the ground is much less than would be with the use of rollers due to the large area of contact between each of the skids and the inside surface 52 of the track. Moreover, the three skids employed in each skid unit constitute means for retaining the track in aligned relationship with the wheels by virtue of their positioning with respect to the ribs 54 and 56 illustrated in FIG. 5.

The upper surface of each track or belt is engaged by a first or forward idler roller 140 on the left side of the vehicle and identical forward idler roller 142 on the right side of the vehicle. Similarly, a pair of rear idler rollers 144 and 146 engage the exterior of the belt or tracks adjacent the rear wheels as illustrated in FIGS. 1 and 2. The idler rollers are mounted on pivotally adjustable support rods 148 which can be adjusted by screws 150 for varying the tension in the belts in an obvious manner. This adjustment is enabled by virtue of the fact that the idler bars extend through a pivotable sleeve 152 to which they are fixedly attached. The outermost end of the support rods 148 is engaged by adjustment screw 154 for adjusting the force with which the idler rollers are biased against the belts and to consequently adjust the tension in the belts. A pair of belt positioning skid plates 160 engage the inside surface of each belt along the upper flight thereof for limiting the amount of downward movement possible of the upper flight as shown in FIG. 1. These positioning plates also prevent the belt from being biased downwardly into engagement with the base block 66, etc., supporting the torsion bar 64. Each of the positioning plates 160 is welded to one side of frame member 18, as illustrated in FIG. 3.

The large number of skids provided between the forward and rear wheels provides an essentially continuous surface engaging the inside of each track or belt so that the localized pressure of belt engagement with the ground is maintained at an absolute minimum, which is much less than would be the case if rollers were employed along the length of the ground engaging flight. Consequently, the subject vehicle does not mar the surface over which it travels and is of particular use when employed on golf carts which must traverse manicured golf greens, fairways, and the like.

While many modifications will occur to those skilled in the art, it should be understood that the spirit and scope of this invention should be determined solely by the appended claims.

I claim:

1. A tracked vehicle comprising a chassis, a first wheel mounted for rotation adjacent the left front end of said chassis, a second wheel mounted for rotation adjacent the right front end of said chassis, a third wheel mounted for rotation adjacent the right rear end of said chassis, a fourth wheel mounted for rotation adjacent the left rear end of aid chassis, a first flexible endless belt fitted over and extending between said first wheel and said fourth wheel, a second endless belt fitted over and extending between said second wheel and said third wheel, each of said belts having an inside surface engaging the wheels over which said belts are fitted and an outer surface and including a ground level flight extending between the lower portions of said wheels over which said belts extend and with each belt also including first and second parallel inwardly extending ribs extending inwardly from said inside surface of said belts and extending around the entire periphery of said inside surface, a plurality of skid means attached to said chassis and supported adjacent and engaging the inside surface of each belt along each ground level flight wherein each of said skids include a horizontal metal plate having a low-friction layer of plastic attached thereto with the said low-friction layer forcefully engaging said inside surface of each belt for resisting upward movement thereof wherein said skid means comprises plural skid units mounted on each side of said chassis with each skid unit comprising a transversely extending pivot shaft having three of said horizontal metal plates pivotally connected thereto and fixedly supported by a pivot shaft support bracket.

2. The invention of claim 1 additionally including a pair of forward idler rollers respectively mounted adjacent each belt immediately rearward of said first and second wheels for depressing and tensioning said first and second belts and a pair of rear idler rollers mounted immediately adjacent the outer surface of said first and second belts immediately forward of said third and fourth wheels for depressing and tensioning said belts.

3. The invention of claim 1 wherein said pivot shaft support bracket is supported by a torsion bar adjustably connected on one end to said chassis and connected on the other end to said pivot shaft support bracket.

4. The invention of claim 3 wherein each of said skid units includes a main centrally oriented skid engaging said inside surface between said first and second ribs and including side surfaces engaging facing surfaces of said first and second ribs, an interior skid plate engaging inside surface inwardly of said second rib and having a side surface engaging the inside surface of said second rib and an outside skid plate engaging said inside surface outwardly of said first rib and having a side surface engaging the outside surface of said first rib.

5. The invention of claim 4 additionally including a pair of forward idler rollers respectively mounted adjacent each belt immediately rearward of said first and second wheels for depressing and tensioning said first and second belts and a pair of rear idler rollers mounted immediately adjacent the outer surface of said first and second belts immediately forward of said third and fourth wheels for depressing and tensioning said belts.

6. The invention of claim 5 additionally including first and second belt positioning plates adjacent said inside surface and extending from said chassis limiting the amount of downward movement of the upper flight of said belt caused by said idler rollers.

7. The invention of claim 6 wherein said low-friction plastic is nylon.